No. 650,828. Patented June 5, 1900.
W. H. ELY.
EYEGLASS GUARD.
(Application filed Mar. 17, 1899.)

(No Model.)

Witnesses:
E. J. Hyde.
C. E. Buckland.

Inventor:
William H. Ely, by
Harry R. Williams
atty.

UNITED STATES PATENT OFFICE.

WILLIAM H. ELY, OF MIDDLETOWN, CONNECTICUT.

EYEGLASS-GUARD.

SPECIFICATION forming part of Letters Patent No. 650,828, dated June 5, 1900.

Application filed March 17, 1899. Serial No. 709,514. (No model.)

*To all whom it may concern:*

Be it known that I, WILLIAM H. ELY, a citizen of the United States, residing at Middletown, in the county of Middlesex and State of Connecticut, have invented certain new and useful Improvements in Eyeglass-Nosepieces, of which the following is a specification.

This invention relates to the construction of the nose-gripping pieces of eyeglasses.

The object of the invention is to form very inconspicuous and inexpensive grips which will hold the glasses securely, yet comfortably.

Each of the grips illustrated has a flat spring-finger extending downwardly and then upwardly and somewhat inwardly from a clip that connects an end of the spring-bow and a lens with a disk, flat on both sides, loosely attached to the end of each finger.

Figure 1:
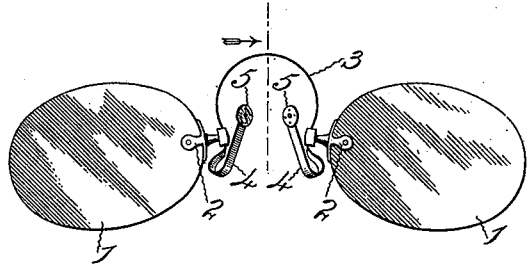
Figure 2:
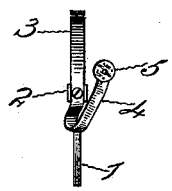
Figure 3:
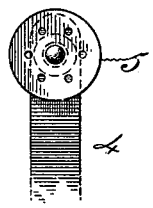
Figure 4:
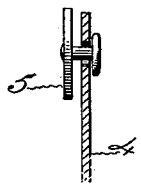

Figure 1 of the drawings is a view of a pair of eyeglasses with the improved nosepieces. Fig. 2 is a view of the nosepiece, looking toward the inner edge of one of the lenses. Fig. 3 is an enlarged view of the end of one of the nosepieces, and Fig. 4 is a sectional view of one of the fingers.

Common clips 2 connect the desired lenses 1 to the ends of an ordinary spring-bow 3. The spring-fingers 4 extend downwardly from the clips, to which they are attached by the screws that fasten the end of the bow, and after curving around extend upwardly and somewhat inwardly from the plane of the lenses and bow. A perforation is made through the upper end of each of these spring-fingers. The disks 5, which are formed of metal or any other suitable thin light material, are flat, so that they have plane surfaces on both sides. These disks have shanks that extend through the perforations in the ends of the spring-fingers and that are headed on the sides opposite the disks. The shanks of these disks are sufficiently smaller in diameter than the perforations and the spaces between the disks and the heads sufficiently large to allow the disks to freely move edgewise in all directions.

When a pair of eyeglasses with nosepieces embodying the present invention are in use, the disks adjust themselves and lie flat against the flesh at the sides of the bridge of the nose, and the ends of the spring-fingers lie flat against the plane outside of the thin disks and also against the nose below the disks, so as to grasp the flesh between them. As the gripping-surfaces of the disks are flat, they cover and bear against an extent of flesh equal to their entire area, so that they may be pressed against the flesh with considerable force without danger of chafing or irritating the skin. The spring-fingers lie flat against the plane outer surfaces of the disks without rocking, so that the glasses are held firmly with no chance for vibrating due to a roll of the fingers on the backs of the disks, and as the disks are very thin and the fingers lie close against them the disks sink into the flesh to such an extent that the fingers will bear against the flesh and assist in holding the glasses in position.

Glasses provided with my improvement are held by both the fingers and the disks, so that they will not readily shake off, and the disks, while comfortably assisting in holding the glasses, prevent the fingers from slipping on the nose, as the edges of the disks will engage the skin if drawn sidewise by any tendency of the fingers to slip.

This construction is very simple and easy to manufacture and assemble. The parts are small and inconspicuous and the glasses are held in place comfortably and firmly.

I claim as my invention—

In combination with the lenses, the spring-bow and the attaching-clips of a pair of glasses, a spring-finger formed in one piece and extending downwardly, then upwardly and inwardly from each clip with a perforation through the upper end of each finger, and a thin disk having plane surfaces on both sides and a shank extending from one side through each perforation, said shanks being smaller than the perforations but having heads larger than the perforations on the sides of the fingers opposite the disks, substantially as specified.

WILLIAM H. ELY.

Witnesses:
EDWARD A. TREADWAY,
STEPHEN D. STODDARD.